Patented Apr. 26, 1938

2,115,576

UNITED STATES PATENT OFFICE 2,115,576

N-SUBSTITUTED CAMPHORIC AMIDES AND PROCESS FOR THEIR PREPARATION

Paul Emile Charles Goissedet and Robert Ludovic Despois, Choisy-le-Roy, France, assignors to Societe des Usines Chimiques Rhone-Poulenc, Paris, France, a corporation of France, manufacturers No Drawing. Application April 27, 1937, Serial No. 139,204. In Great Britain April 27, 1936

7 Claims. (Cl. 260—124)

The present invention relates to the preparation of new N-substituted camphoric amides.

The present invention has for its object the preparation of valuable therapeutic compounds having remarkable analeptic properties.

We have found that the bis-dialkyl amides of the different stereoisomeric camphoric acids show these properties in a very high degree, the bis-diethyl amides possessing these properties to the most pronounced extent.

According to the present invention these new bis-dialkyl amides are prepared by applying to the camphoric acids in particular the general known methods for the preparation of bis-dialkyl amides of di-acids, as for example, by preparing the dichloride of a camphoric acid and causing it to react with a dialkylamine or by preparing first a mono-dialkylamide of camphoric acid which is transformed into the acid chloride of the camphoric mono-di-alkylamide which is then caused to react with a dialkylamine.

In this preparation, a partial isomerization of the camphoric acid initially used into its opposite diastereoisomeride is sometimes brought about in the course of the operation, and one finally obtains a mixture of the bis-dialkyl amides of these two stereoisomers.

The invention includes the preparation of the mixture of camphoric bis-dialkyl amides thus obtained, as well as that of the pure products isolated from the above mixture, or obtained directly with avoidance of the isomerization of the camphoric acid in the course of the preparation. In all cases a product physiologically active and capable of being used in therapeutics is obtained.

The following examples illustrate how the invention may be carried out in practice, but it is to be understood that the invention is in no way limited to the details given in these examples:—

Example 1

Following the technique of Moitessier (Comptes Rendus, vol. 52, p. 871) 210 grams of phosphorus pentachloride are caused to react with 100 grams of d-camphoric acid. The product of the reaction distils at 134–136° C. under a pressure of 10 mm. of mercury and yields 75 grams of a dichloride of camphoric acid consisting of a mixture of dichlorides of the d-camphoric and the l-iso-camphoric acids.

23.5 grams of this mixed dichloride are added little by little to a solution of 43.8 grams of diethylamine in benzene, the reaction being controlled by external cooling with ice. When the reaction is ended the hydrochloride of diethylamine is removed by filtration and the benzene is distilled off. The residue so obtained is a mixture of the bis-diethyl amides of the d-camphoric and l-iso-camphoric acids which can be purified by distillation in vacuo (boiling point 190° C. under a pressure of 5 mm. of mercury). By successive recrystallizations from ligroin it is possible to isolate the bis-diethyl amide of the d-camphoric acid. It melts at 130° C. and has a rotatory power of +90° in absolute alcohol.

Starting from the l-camphoric acid, according to the same process, a mixture of bis-diethyl-amides of the l-camphoric and d-iso-camphoric acids is obtained from which it is possible to isolate by crystallization the derivative of l-camphoric acid.

Example 2

23.5 grams of the chloride of l-iso-camphoric acid in solution in ligroin, obtained according to the method of Bredt, (Berichte 45, p. 1424) are added little by little to a cooled solution of 43.8 grams of diethylamine in benzene. By treating the product of the reaction as in Example 1, the bis-diethylamide of l-iso-camphoric acid is obtained. It melts at 80° C. and has a rotatory power of +17° in absolute alcohol.

Example 3

20 grams of d-camphoric acid are suspended in 100 cc. of ligroin; 42 grams of phosphorus pentachloride are then added and the reaction allowed to take place at ordinary temperature. After several hours the ligroin solution is agitated with ice-water to eliminate phosphorus oxychloride. The solution of d-camphoryl chloride is poured little by little into a solution of 43.8 grams of diethylamine in benzene with the application of cooling. When the reaction is finished the hydrochloride of dimethylamine is removed by filtration, and the benzene and the excess of diethylamine removed by distillation. The residue consists only of the bis-diethylamide of d-camphoric acid which can be purified as described in Example 1 by crystallization from ligroin.

In the same way, by using the appropriate amines the following compounds can be prepared:

(a) Bis-dimethylamide of d-camphoric acid distilling at 175° C. at 2 mm. pressure. By crystallization from a mixture of benzene and ligroin it is obtained in the form of white crystals, soluble in water and in organic solvents having a melting point of 91° C. and having an optical rotatory power $\alpha D = +109.3°$ in absolute alcohol.

(b) Bis-dibutylamide of d-camphoric acid, a viscous liquid insoluble in water but soluble in organic solvents having a boiling point of 220–222° C. at 1 mm. and having a rotatory power, αD=+48.6° in absolute alcohol.

(c) Bis-diamylamide of d-camphoric acid, viscous liquid insoluble in water but soluble in organic solvents boiling at 230–232° C. at 1 mm. and having a rotatory power αD=+35.8° in absolute alcohol.

(d) Bis-methylethylamide of d-camphoric acid, white crystals soluble in water and in organic solvents having a melting point of 61° C. and boiling at 180° C. at 2 mm. and having a rotatory power αD=+94.5° in absolute alcohol.

*Example 4*

10 grams of α-monodiethylamide of d-camphoric acid (prepared according to the method of Freylon Ann. de Chimie et de physique, 8th series, vol. 15, page 284) are dissolved in 10 grams of thionyl chloride. The mixture is heated for one hour on the water bath and the excess of thionyl chloride removed by distillation. The residue is introduced in small quantities at a time into a solution of 10 grams diethylamine in benzene with the application of cooling. When the reaction is finished the bis-diethylamide of d-camphoric acid is isolated as in Example 3.

If the diethylamine used in the above process is replaced by dimethylamine, the α-diethylamide-β-dimethylamide of d-camphoric acid is obtained in the form of white crystals, soluble in water and in organic solvents, having a melting point of 56° C. and a boiling point of 173° C. at 2 mm. and having a rotatory power αD=+99.7° in absolute alcohol.

By using methylethylamine one obtains the α-diethylamide-β-methylethylamide of d-camphoric acid in the form of white crystals sparingly soluble in water and soluble in organic solvents, having a melting point of 61° C. and a boiling point of 183° C. at 2 mm. and having a rotatory power αD=+92.5° in absolute alcohol.

*Example 5*

A mixture of 35 grams of α-mono-dimethylamide of d-camphoric acid (prepared according to the method of Auwers and Schnell, Berichte, vol. 26, page 1524) and 75 grams of thionyl chloride is heated to boiling for one hour. The excess of thionyl chloride is removed by distillation and the residue is introduced in small quantities at a time into a solution of 10 grams of diethylamine in benzene with the application of cooling. When the reaction is finished the hydrochloride of diethylamine is separated by filtration and the benzene is removed by distillation. By distilling the residue under high vacuum, the α-dimethylamide-β-diethylamide of d-camphoric acid is obtained in the form of a colourless liquid boiling at 187° C. at 3 mm. and crystallizing on freezing in the form of white crystals soluble in water and organic solvents. The melting point is 41–42° C. and the rotatory power αD=+95° in absolute alcohol.

If the diethylamine used in this example is replaced by dimethylamine the bis-dimethylamide of d-camphoric acid identical with that obtained as described in Example 3 is obtained.

What we claim and desire to secure by Letters Patent is:—

1. A process for the preparation of new N-substituted camphoric amides by treating the chloride of a monodialkylamide of camphoric acid with a dialkylamine.

2. A process for the preparation of new N-substituted camphoric amides by treating the chloride of a monodialkylamide of camphoric acid with a diethylamine.

3. The bis-dialkylamides of camphoric acid.

4. The bis-diethylamide of camphoric acid.

5. The α - diethylamide - β - dimethylamide of camphoric acid.

6. The α-diethylamide-β-methylethylamide of camphoric acid.

7. The bis dialkylamides of camphoric acid of the general formula

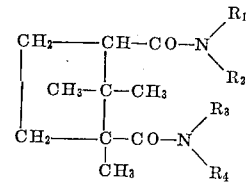

in which $R_1$, $R_2$, $R_3$, and $R_4$ represent the same or different alkyl groups.

PAUL EMILE CHARLES GOISSEDET.
ROBERT LUDOVIC DESPOIS.